United States Patent [19]

Geissbühler

[11] Patent Number: 5,272,199
[45] Date of Patent: Dec. 21, 1993

[54] SKI COATING AND FILLER FOR A COATING

[75] Inventor: Urs Geissbühler, Thun, Switzerland

[73] Assignee: IMS Kunststoff AG, Switzerland

[21] Appl. No.: 830,900

[22] Filed: Feb. 4, 1992

[30] Foreign Application Priority Data

Oct. 18, 1991 [CH] Switzerland .................. 3062/91

[51] Int. Cl.$^5$ .................. C08K 3/08; C09G 1/14; C10M 125/04
[52] U.S. Cl. .................. 524/439; 524/440; 524/441; 524/495; 524/496; 280/604
[58] Field of Search ............ 524/439, 441, 495, 496

[56] References Cited

U.S. PATENT DOCUMENTS

| 2,947,646 | 8/1960 | Devaney et al. | 524/441 |
| 3,345,322 | 10/1967 | Smith | 524/441 |
| 4,882,227 | 11/1989 | Iwase et al. | 524/441 |
| 4,937,015 | 6/1990 | Krieg et al. | 524/441 |
| 4,960,818 | 10/1990 | Reilly et al. | 524/441 |
| 5,045,114 | 9/1991 | Bigalk et al. | 524/441 |
| 5,069,803 | 12/1991 | Sugimura et al. | 524/439 |

Primary Examiner—Paul R. Michl
Assistant Examiner—Olga Asinovsky
Attorney, Agent, or Firm—Shoemaker and Mattare Ltd.

[57] ABSTRACT

A ski coating made from sintered PE contains fillers with raised thermal conductivity for improvement of the running characteristics. Additionally, additives are employed which possess melting temperatures in the region between −20° C. and +10° C.

19 Claims, No Drawings

SKI COATING AND FILLER FOR A COATING

The invention concerns a ski coating made from plastic, in particular a sintered polyethylene (PE). The sliding sequence between the running surface of a ski and the snow is relatively complicated and not fully researched in all its details. It is known that snow cristals melt locally as a result of the frictional heat arising from the sliding sequence. The water particles arising can thus lead to conditions of partial hydrodynamic lubrication. At higher speeds, the water thus formed can even extend to cover the entire under-surface of the ski, which can, however, lead to an undesireable "suction effect", negatively influencing the sliding speed.

Through the introduction of additives to the mixture, such as, for example, aluminium powder and/or graphite and/or carbon black, this negative effect can be prevented. This results mainly because carbon possesses greater thermal conductivity than the low pressure polyethelyne used almost exclusively as a ski coating material. (This effect is described in CH-patents 657 993 or 660 018.)

Ski coatings modified in this way with the addition of carbon, for example, are superior to ski coatings made from low pressure polyethylene without additives, especially at higher snow temperatures.

Under medium-cold snow conditions and at varying sliding speeds, however, excessive frictional heat can be conducted away through the coating because of the raised thermal conductivity of the coating, so that the temperature of the running surface remains lower and only an insufficient number of snow cristals melt.

The purpose of the invention is to create a ski coating and a filler for a ski coating which on the one hand possess good thermal conductivity at higher snow temperatures (for example between 0° C. and −8° C.) and, accordingly, avoid the "suction effect", but which on the other hand conduct less frictional heat away through the coating under snow conditions of medium coldness (approximately between −8° C. and −20° C.) and varied skiing techniques, and thus ensure the desired generation of water particles in this range. According to the invention this purpose is achieved primarily according to the characteristics of the patent claims.

Through the use of a filler with greater thermal conductivity, according to the invention the conducting of frictional heat away through the coating is generally improved throughout. On the other hand, however, through the mixing in of an additive which transforms from a solid phase into a liquid phase at one or more predicted points and therefore absorbs heat energy, it is ensured that the energy of phase transformation stored in this way is not conducted away through the coating, but will be released again as soon as the surface temperature of the coating lowers below the melting point of the additive. Thus, the thermal conductivity of the ski coating is able to be so influenced that this can in practice be arbitrarily adjusted to the desired properties of a ski. Numerous types of these additives, with a temperature of phase transformation which lies around the freezing temperature, are commonly known and in use. Through the manufacture of mixtures or alloys, the melting point can at the same time be set in a known way. Through introducing dosed volumes of additive, the thermal characteristics can likewise be influenced.

It is also possible to add differing additives with differing melting points, and thus to control the thermal characteristics throughout a wide temperature range. Thus, for example, the thermal conductivity can be raised for a racing ski coating or a coating for skiing at higher speeds, and the heat capacity of the "heat capacitor" formed by the additive can be influenced by lower melting temperatures, in order to be able to conduct the anticipated higher frictional heat away reliably.

For the expert in the art, these types of adjustment are possible without the framework of the invention being exceeded. Generally speaking, additives with melting temperatures between −20° C. and +5° C. can be deployed, through the process of sintering into the coating plastic, for example, during which the additive will remain fixed, also in its liquid phase, and preserved within the coating. It is important in this case that an additive is used that is not fugitive (will not evaporate) at the temperatures incurred during incorporation, but rather wets, for example, the carbon particles and/or the plastic powder.

Organic cristalline compounds are particulary suitable as additives, such as, in particular, alkane or high boiling point compounds such as oleinalcohol (melting point =0° C.), undecylaldehyde (Melting point −4° C.), 2-allylphenole (melting point −6° C.), polyethyleneglycole with, for example mole mass 400 plus or minus 20 (g/mol) and a melting point at 5° C., or mole mass 300 plus or minus 10 (g/moll) and a melting point (g/mol) at −10 ° C.

Tridecane ($C_{13}H_{28}$) possesses particularly good properties.

Inorganic cristalline compounds produce good heat capacity. For example, through gallium of gallium alloys, an additive with melting temperatures in the area demanded can be set around the freezing point. Alloys of gallium, indium and tin have particularly proven themselves. The additive should, with that, contain 65%W to 75%W gallium and indium, respectively tin from 35%W to 25%W, the indium being able to amount to 20%W to 30%W, according to the amount of gallium, and the tin being able to amount to 3%W to 7%W. (Weight percentage always being related to the total amount of additive.)

It is of particular advantage if the alloy contains approximately 70%W gallium, approximately 25%W indium and approximately 5%W tin. Additives whose melting point lie between approximately +5° C. to −8° C., preferably between approximately 0° C. to −4° C., have proved themselves to be particularly suitable, universally.

With regard to good thermal conductivity, it is advantageous if the portion of efficiently conductive material, in particular of aluminium powder or of carbon, amounts to between 5%W and 30%W of the plastic, in particular of the polyethylene.

The use of organic cristalline compounds as an additive permits advantageous realisation of the invention, with an addition of 1%W to 20%W related to 100 parts of the plastic, in particular of the PE, preferably in the region of 1%W to 10%W portion of additive, related to 100% plastic.

With the use of inorganic additive materials as "heat capacitors" within the coating material, the invention can be realised with additives in the region of 0.001%W and 10%W related to 100 parts PE, the portion amounting to between 0.01%W and 1.0%G with particular advantage.

Evidently, through the choice of melting temperature and the amount of "heat capacitor additive", the property of a running surface can be practically and arbitrarily influenced. Thus, it has been measured, for example, that a running surface temperature of $-0.6°$ C. can be set at a snow temperature of $-4.8°$ C. (Compare: Cold Regions Research+Engineering Laboratory Report 89-23). This points to high heat energy and poor conductivity. Through the additives according to the invention, a "thermo-active effect" can now be set within the desired ranges.

In the following, the invention is more closely described with the aid of examples:

EXAMPLE 1

In a Henschel Hot Mixer, 100 parts of a carbon black with 20nm particle size and an oil requirement of 500% is homogenously mixed with 10 parts of tridecane ($C_{13}H_{28}$) for 10 minutes.

15 parts of this mixture are homogenously mixed in a rapid mixer in a second working sequence with 85 parts ultra-high molecular low pressure polyethylene Hostalen (Reg. Trademark) GUR 412 with a mole mass of approx. $4 \cdot 10^6$ and a mean grain diameter of approximately $150\mu$.

In a cylindrical press mold, under known application of heat and pressure (as, for example, stated in Hoechst's brochure for their low pressure PE "Hostalen GUR"- Broshure HKR 112-7089 C 12299/14), this mixture is sintered to a homogeneous cylindrical sintered body. After cooling, a continuous strip is peeled from this cylindrical sintered body in the desired thickness of a ski coating, for example 1.4 mm.

The transformation point in the coating, measured by dynamic differential calorimetry (DDC), lies at $-4°$ C.

Skis which are equipped with this coating display a significantly higher sliding speed in sliding tests when compared to corresponding skis with a coating which is formulated without tridecane.

EXAMPLE 2

In accordance with example 1, in an initial phase a homogenous mixture of 100 parts of the carbon black mentioned with 1 part of an alloy of 70% gallium, 25% indium and 5% tin is manufactured. 10 parts of this mixture is, as described in example 1, mixed with 90 parts UHMW PE and worked to a ski coating. The transformation point, measured by DDC, lies at $+5°$ C.

A homogenous mixture, manufactured without carbon black, of 100 parts UHMW PE and 0.1 part of the Ga/In/Sn alloy shows no transformation point in the DDC and no improved sliding characteristics in sliding tests.

It is suspected that during the mixing mode, according to the invention the Ga/In/Sn alloy is protected from oxidative change by the carbon black during the sintering procedure.

Naturally, in place of the PE recommended in the examples, another plastic material such as PTFE (polytetrafluoroethylene) can also be used. Naturally, ski coatings can be used which are not only manufactured in a sintering procedure with a subsequent peeling process, but with an extrusion process, for example. Essential to the invention is the addition of a filler which, on the basis of the phase transformation from the solid into the liquid phase, acts as a heat capacitor in the running surface material of the ski.

I claim:

1. A ski coating comprising a sintered plastic having a filler for the improvement of sliding properties, wherein
   the plastic is a high molecular weight polymer selected from the group consisting of polyethylene and polytetrafluoroethylene and the filler comprises both
   finely divided carbon having a thermal conductivity higher than that of the sintered plastic, for increasing the thermal conductivity of the coating, and
   an additive having a melting point in the range of $-15°$ C. to $+5°$ C. for increasing the thermal capacity of the coating by engaging in phase transformation within said range, said additive being a low melting point metal alloy or an organic crystalline compound.

2. A ski coating according to claim 1, wherein the additive is an organic crystalline compound.

3. A ski coating according to claim 2, wherein the additive is an alkane.

4. A ski coating according to claim 3, wherein the additive is tridecane ($C_{13}H_{28}$).

5. A ski coating according to claim 1, wherein the additive is an inorganic crystalline compound.

6. A ski coating according to claim 1, wherein the additive contains a gallium alloy.

7. A ski coating according to claim 6, wherein the additive contains an alloy with gallium, indium and tin.

8. A ski coating according to claim 7, wherein the alloy contains approximately 65% to 75%W gallium, 20% to 30%W indium and 3% to 7%W tin.

9. A ski coating according to claim 8, wherein the alloy contains approximately 70%W gallium, approximately 25%W indium and approximately 5%W tin.

10. A ski coating according to claim 1 wherein the melting temperature of the additive is in the range of $-8°$ C. to $+5°$ C.

11. A ski coating according to claim 10, wherein the melting temperature of the additive is in the range of $-4°$ C. to $0°$ C.

12. A ski coating according to claim 1 wherein the plastic particles are polyethylene and the material with higher thermal conductivity, amounts to approximately 5% to 30% of the weight of the polyethylene.

13. A ski coating according to claim 2, wherein the portion of the organic crystalline compound of the additive amounts to between 1% to 20% in relation to 100 parts weight of the polyethylene.

14. A ski coating according to claim 13, wherein the organic crystalline portion amounts to between approximately 1% and 10% of the weight of the polyethylene.

15. A ski coating according to claim 13, wherein the portion of the inorganic crystalline compound of the additive amounts to between approximately 0.001% to 10% of the weight of the polyethylene.

16. A ski coating according to claim 15, wherein the portion amounts to between approximately 0.01% and 1.0%W.

17. A ski coating according to claim 1 wherein the filler contains at least two additives with differing melting temperatures between $-15°$ C. and $+5°$ C.

18. A ski coating according to claim 1, wherein the material with higher thermal conductivity comprises powdered carbon.

19. A ski coating according to claim 12, wherein the material with higher thermal conductivity comprises carbon black.

* * * * *